United States Patent [19]

Reichow

[11] Patent Number: 4,581,948
[45] Date of Patent: Apr. 15, 1986

[54] LOAD CELL ASSEMBLY FOR USE IN A VEHICLE PLATFORM SCALE

[75] Inventor: Keith W. Reichow, Renton, Wash.

[73] Assignee: World Wide Weighing, Inc., Kirkland, Wash.

[21] Appl. No.: 578,120

[22] Filed: Feb. 7, 1984

[51] Int. Cl.[4] .......................... G01L 1/22; G01G 3/14
[52] U.S. Cl. .................................. 73/862.65; 177/211
[58] Field of Search ...................... 73/862.65; 177/211

[56] References Cited

U.S. PATENT DOCUMENTS

| | | | |
|---|---|---|---|
| 3,155,184 | 11/1964 | Raskin | 177/211 X |
| 3,159,227 | 12/1964 | Raskin et al. | 177/211 X |
| 3,347,326 | 10/1967 | Raskin | 177/211 X |
| 3,743,041 | 7/1973 | Videon | 73/862.65 X |
| 3,879,998 | 4/1975 | Bradley | 177/211 X |

*Primary Examiner*—Charles A. Ruehl
*Attorney, Agent, or Firm*—Jensen & Puntigam

[57] ABSTRACT

A load cell assembly which includes a deflectable load cell (11) having strain transducers which measure the downward deflection of the load cell (11) in response to a load. The load cell (11) includes grooves (31) in the lower surface thereof in the vicinity of each end thereof. A rocker pin (33) is positioned in each groove (31), the groove (31) being configured in such a manner that the pin (31) is captured therein, so that the pin (33) in the groove (31) acts in operation to restrain the load cell (11), but so that the pin (31) extends below the lower surface of the load cell (11). The pin (33) is generally barrel-shaped, having its greatest dimension at its center, so that the load cell (11) is supported on a small area (35) of the pin (33), generally about the centerline of the load cell (11). The load cell assembly also includes two end mounts (41) for supporting the respective ends of the load cell (11), each end mount (41) including means for receiving the ends of the rocker pins (33), which extend beyond the side surfaces of the load cell.

13 Claims, 5 Drawing Figures

LOAD CELL ASSEMBLY FOR USE IN A VEHICLE PLATFORM SCALE

DESCRIPTION

TECHNICAL FIELD

This invention relates generally to the art of beam-type load cells, and more particularly concerns a beam-type load cell assembly having an improved end support system.

BACKGROUND OF THE INVENTION

A beam-type load cell generally comprises a beam of high strength steel or aluminum, on which are mounted a number of strain gauges which produce an electrical signal in response to a downward deflection of the beam caused by weight on the load cell. In a typical application, a plurality of load cells are used to support a weigh platform deck, onto which a vehicle to be weighed, typically a truck, is positioned. The weight of the vehicle causes a downward deflection of the metal beam of each load cell, creating stress in the beam. The strain gauges, which are arranged in various combinations, typically in the vicinity of the opposite ends of the load cell, measure the stress and produce a corresponding electrical output. The electrical output of the strain gauges at each end of each individual load cell is adjusted, and the outputs of all the load cells are then combined so that the total output is accurately indicative of the weight of the vehicle positioned on the platform.

There has been a significant amount of effort in the load cell art to improve both the accuracy and the reproducability of results produced by the load cell. In addition, attempts have been made to improve the durability of the load cell, so that it is capable of operating in adverse conditions, such as, for instance, under water for extended periods of time. One line of development in the art has been a so-called "floating" load cell, as evidenced by U.S. Pat. No. 4,281,781 titled VEHICLE PLATFORM SCALE. A floating load cell is characterized by being freely supported off of its respective ends, typically by means of a pin which is positioned in a groove in the lower surface of the load cell. In such a load configuration, the ends of the load cell are not bolted or otherwise rigidly fixed in position, so that the load cell is free to deflect downwardly about the supporting pins. However, even in a floating load cell, it is still necessary to support the ends of the load cell and to prevent the load cell from lifting off the pin. Previous attempts to provide such support, however, have significant disadvantages. The support assemblies have generally been bulky and relatively expensive. Further, and perhaps most importantly, the results of weigh platforms using such support assemblies for the load cells have been characterized by severe inaccuracies, due to uneven surfaces on which the load cell is positioned and collection of debris in the support assemblies.

Accordingly, the inventor has developed a load cell assembly which incorporates a particular structural arrangement for supporting the ends of a floating (freely supported) load cell. The load cell assembly described herein provides accurate, reproducible results and is capable of operating for extended periods under harsh operating conditions, including under water.

SUMMARY OF THE INVENTION

Accordingly, the present invention includes strain transducer means for measuring deflection of the load cell under a load, the load cell including a groove in the lower surface thereof in the vicinity of each end thereof; a rocker pin which is configured to fit within the groove, the pin extending below the lower surface of the load cell, the rocker pin being configured such that its maximum diameter occurs over a relatively narrow contact region; and means for supporting the respective ends of the load cell such that each end of the load cell is supported off the narrow contact region of the pin, approximately on the centerline of the load cell.

DESCRIPTION OF THE PREFERRED EMBODIMENT

Figure 1:
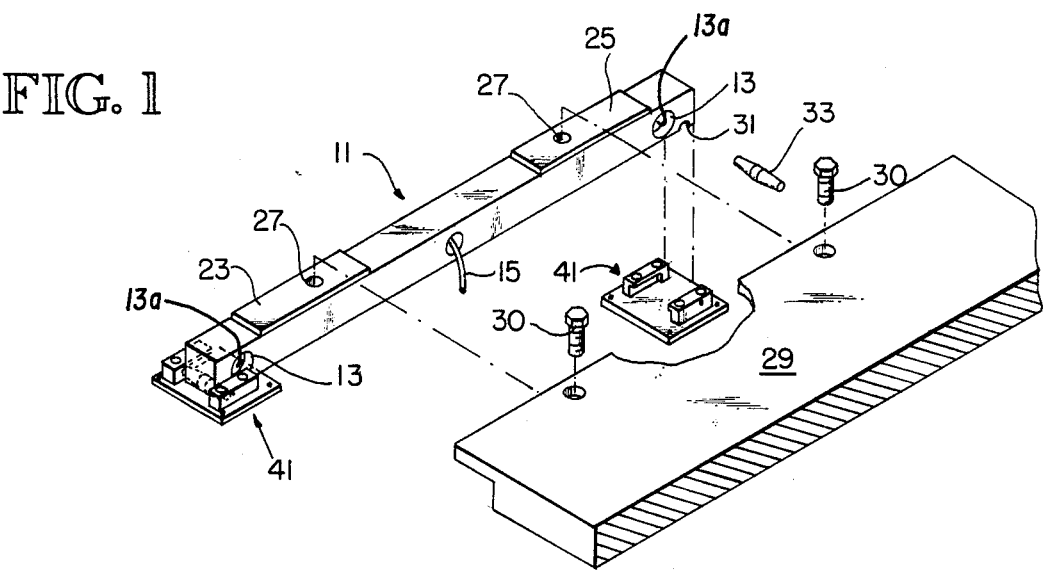
FIG. 1 is an exploded view of the load cell assembly of the present invention, showing also a portion of a platform deck.
Figure 2:
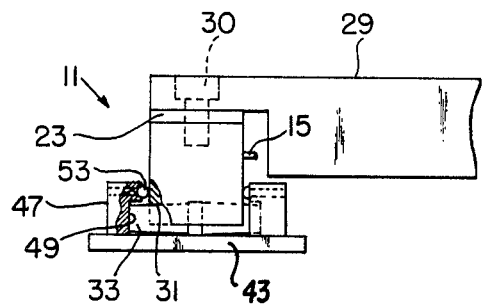
FIG. 2 is an elevation view showing one end of the load cell of FIG. 1, the end mount structure associated therewith, and a portion of a platform deck.
Figure 5:
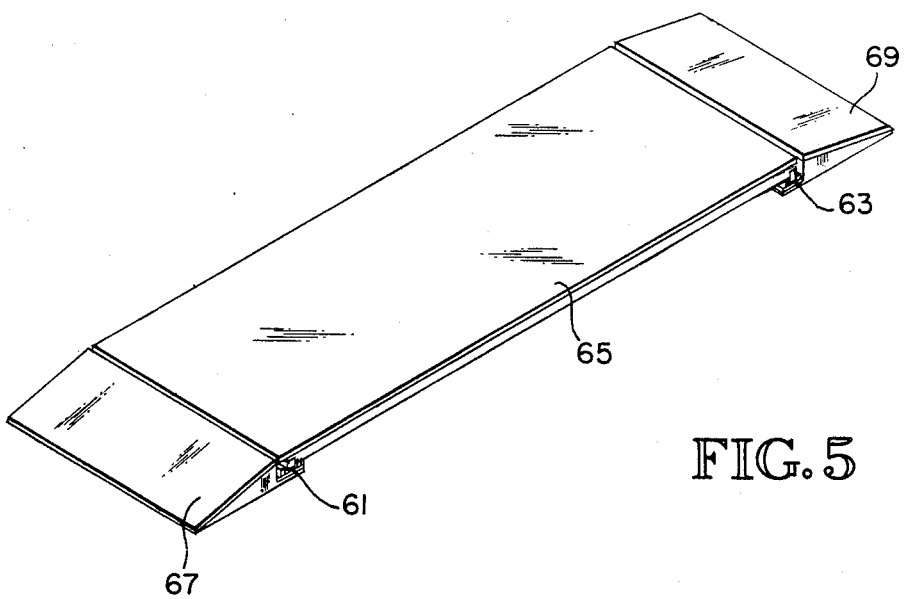
FIG. 5 is a perspective view of a low-height platform scale incorporating the load cell assembly of the present invention.

FIGS. 1 and 2 show generally the load cell assembly of the present invention. The assembly includes a beam-type load cell shown generally at 11 which in the embodiment shown is a high strength steel bar approximately 29 inches long with cross-sectional dimensions of 1.9 inches (width) and 1.9 inches (height). Also in the embodiment shown, there are recesses 13-13 in the respective side surfaces of the load cell 11 in which conventional strain gauges 13a are positioned. The recesses are located in each side surface of the load cell, near the respective ends thereof. The strain gauge arrangement at each end is individually adjusted in a known fashion to provide correct outputs. The output lines from each strain gauge arrangement are routed through an interior channel (not shown) in load cell 11 to a centrally positioned load cell calibration circuit (not shown), from which load cell output line 15 extends. In a platform scale arrangement such as shown in FIG. 5, the signals from all the load cells supporting the platform deck are combined to produce a total output signal which is then used to produce the numeric value of the weight of the vehicle.

Positioned on the upper surface 21 of the load cell 11 are two bearing plates 23 and 25 positioned generally near each end of the load cell, but not so close to the end as to be above the recesses 13. Bearing plates 23 and 25 in the embodiment shown are stainless steel, approximately 7" long by 1½" thick. The bearing plates are secured to the top surface of the load cell by means of a bolt (not shown), which extends through the bearing plate into the load cell. Openings 27-27 through the bearing plate and into load cell 11 are for attachment of a weigh platform deck 29 to the load cells, by means of bolts 30-30.

Figure 3:
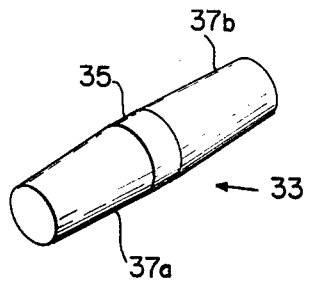
FIG. 3 is a perspective view of the rocker pin element of the load cell assembly.
Figure 4:
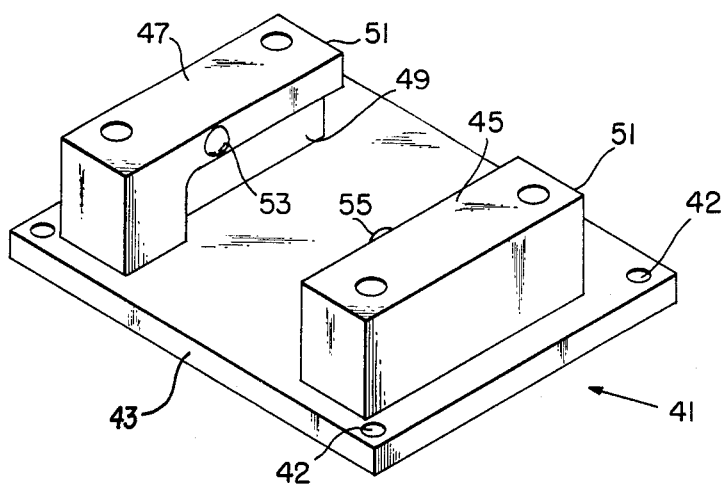
FIG. 4 is a perspective view showing one end mount of the load cell assembly of FIG. 1.

FIGS. 2, 3 and 4 show portions of the end support structure of the present invention for the load cell. Referring to FIG. 2, there is located in the lower surface of the load cell 11, in the vicinity of each end thereof, a greater than semi-circular groove 31, which groove extends between the respective side surfaces of load cell 11. In the embodiment shown, the groove 31 is located between the recess 13 and the end of the load cell, in particular approximately 0.6 inches from the end of the load cell. It is important that the groove 31 be positioned relatively close to the end of the load cell, so as to provide stability for the load cell as it deflects in operation.

As mentioned above, the groove 31 is more than semicircular, so that it is capable of capturing a pin 33 which has been inserted in the groove from the side, i.e. so that the pin is retained within the groove, preventing the load cell from lifting off and away from the pin. The groove is approximately 270 degrees (semicircular is 180 degrees) and has a diameter slightly larger than the largest diameter of the pin 33 which is positioned in the groove. It should be understood, however, that the number of degrees of the boundary of the groove could be greater or smaller, as long as the pin is captured within the groove.

The pin 33 is shown in detail in FIG. 3 and is shown in operational relationship relative to the end mount in FIG. 2. In the embodiment shown, pin 33 is heat-treated stainless steel, approximately 2.5 inches long, so that its ends extend a short distance beyond the respective side surfaces of the load cell.

Pin 33 has a dual taper, with a region 35 of greatest diameter approximately in the center of the pin. In the embodiment shown, the center region 35 is in the shape of a ring, having a width of approximately 0.25 inches. The diameter of the pin in this region is aproximately 0.62 inches. The pin decreases in diameter in a straight taper from the center region 35 to the respective ends of the pin. Although center region 35 is flat and the tapered regions 37a and 37b are straight in the embodiment shown, it should be recognized that other surface configurations can be utilized, including for example a continuously curved surface, as long as there is a region of greatest diameter approximately in the center of the pin.

The significant advantage of such a configuration is that the load cell is free to deflect vertically about the pins and free to rock from side to side over a given angle without affecting the accuracy of the load cell. This is because the load is concentrated in the load cell through the center region of the pins, instead of being concentrated on one side or the other. In the embodiment shown, the pins are configured so that the given angle is approximately 4 degrees to either side, although the angle could be within the range of 2 degrees to 8 degrees, or even greater, depending on the particular configuration of the pin.

With such a structure, there is a significant tolerance with respect to the relative position of the end mounts. In the prior art, it has been necessary to provide an extremely rigid support structure extending the entire length of the load cell, so that the two end mounts maintain the same relative position in use of the load cell. With the present invention, however, the end mounts can move relative to each other, as may occur when the platform scale is placed on uneven ground, without the load cell twisting as a result. Twisting of the load cell is undesirable as it significantly decreases the accuracy of the load cell's results.

The end mounts of the load cell assembly are shown in FIGS. 1, 2 and 4. The end mount shown generally at 41 (FIG. 4) includes a square plate 43 of steel which in the embodiment shown is 4.2 inches by 3.5 inches by ¼ inch thick. Plate 43 typically has openings 42 in the respective corners thereof so that the end mount 41 may be conveniently secured to the floor of a weighing pit or the like. Alternatively, the end mounts may be positioned directly on the ground or floor. Welded to the upper surface of plate 43, or attached by similar securing means, are two spaced apart retaining blocks 45 and 47. In the embodiment shown, the retaining blocks are approximately 2.45 inches long by 0.6 inches wide by 1 inch high. The center lines of the blocks are spaced apart by approximately 2.95 inches. Each block has a groove 49 therein along the inner side surface thereof adjacent the upper surface of plate 43. The groove extends from the front end 51 of the block rearwardly approximately 2½ inches. The groove 49 is large enough to accommodate the extending end of pin 33. Extending a small distance from the inner side surface of each block 47 and 49 are rivets 53 and 55, arranged so that the distance between the rivets on the blocks 45 and 47 is only slightly greater than the width of the load cell. The two rivets provide lateral restraint for the load cell, while the rear edge of the groove provides longitudinal restraint for the load cell. Vertical restraint is provided by the top edge of the groove in blocks 45 and 47, in combination with the pin being captured in the groove in the lower surface of the load cell.

FIG. 5 shows two load cell assemblies 61 and 63 supporting a platform deck 65 in a low height platform scale configuration. Platform deck 65 is 10 feet 2 inches long and 32 inches wide. Platform deck 65 is secured to the two load cells by two bolts, as described above. This provides a secure relationship between the platform deck and the two load cells. Ramp elements 67 and 69 are provided at each end of the platform scale to permit vehicles to be weighed to move up onto the platform 65. In such a configuration, platform 65 stands approximately 3¼ inches off the ground. Small differences in vertical height increase the dynamic accuracy of the load. Generally, the lower the height of the platform, the greater the accuracy.

Even though the present invention has been disclosed in the context of a vehicle platform scale, it should be understood that the load cell of the present invention can be used in other platform scale configurations, including both fixed and portable installations. Also, the principles of the present invention are not limited to a particular type of load cell, but may be used with various kinds of load cells, including both bending beam and shear type load cells. The invention results in an increase in accuracy and resproducability of results.

It should also be understood that various other changes, modifications and substitutions may be incorporated in the preferred embodiment disclosed herein without departing from the spirit of the invention, which is defined by the claims which follow.

I claim:

1. A load cell assembly, comprising:
a beam-type load cell which includes strain transducer means for measuring deflection of the load cell under a load, the load cell including a groove in the lower surface thereof in the vicinity of each end thereof;
a rocker pin configured to fit within the groove, said pin extending below the lower surface of the load cell, said rocker pin being configured such that its maximum diameter occurs over a relatively narrow contact region;

means for supporting the respective ends of the load cell such that each end of the load cell is supported off the narrow contact region of said pin, approximately on the centerline of said load cell.

2. An apparatus of claim 1, wherein the groove is configured such that said rocker pin is captured in the groove, preventing the load cell from lifting off said rocker pin in operation.

3. An apparatus of claim 2, wherein said rocker pin is generally barrel-shaped, and is sufficiently long that the respective ends thereof extend beyond the respective side surfaces of said load cell.

4. An apparatus of claim 2, wherein the narrow contact region of said rocker pin is approximately in the center thereof.

5. An apparatus of claim 3, wherein said supporting means includes two end mounts, each end mount including means for receiving the respective ends of said rocker pin.

6. An apparatus of claim 5, wherein said pin receiving means in each of said end mounts are so configured relative to the ends of said rocker pin that each of said end mounts have lateral freedom of movement within the range of 2-8 degrees relative to the load cell.

7. An apparatus of claim 6, wherein said end mounts include means for restraining longitudinal and vertical movement of the load cell relative to said end mounts.

8. An apparatus of claim 7, wherein said end mounts include a flat plate with two spaced apart block elements secured thereto, each of said block elements including a groove in the inner side surfaces thereof to receive the ends of said rocker pin, said groove being positioned such that when the ends of said rocker pin are positioned in said grooves, the portion of greatest diameter of said rocker pin contacts the upper surface of said plate, thereby providing support for said load cell.

9. An apparatus of claim 8, including lateral restraining means extending toward each other from the respective inner surfaces of said block elements, wherein the distance between the restraining means is slightly greater than the width of said load cell, thereby restraining the lateral movement of said load cell relative to said end mounts.

10. A load cell assembly, comprising:

a beam-type load cell which includes strain transducer means for measuring deflection of the load cell under a load, the load cell including a groove in the lower surface thereof in the vicinity of each end thereof;

a rocker pin configured to fit within the groove, wherein the groove is configured relative to said rocker pin such that said rocker pin is captured in the groove, preventing the load cell from lifting off said rocker pin in operation; and means for supporting the respective ends of the load cell such that each end of the load cell is supported on said rocker pin.

11. An apparatus of claim 10, wherein said rocker pin is sufficiently long that the respective ends thereof extend beyond the respective side surfaces of said load cell.

12. An apparatus of claim 11, wherein said supporting means includes two end mounts, each end mount including means for receiving the respective ends of said rocker pin.

13. An apparatus of claim 12, wherein said end mounts include means for restraining longitudinal and vertical movement of the load cell relative to said end mounts.

* * * * *